United States Patent
Kim et al.

(10) Patent No.: US 10,226,904 B2
(45) Date of Patent: Mar. 12, 2019

(54) APPARATUS FOR LAMINATING OBJECT WITH FIBER TOW

(71) Applicant: Hyundai Motor Company, Seoul (KR)

(72) Inventors: Min Soo Kim, Suwon-si (KR); Sang Sun Park, Anyang-si (KR); Jun Young Kim, Hwaseong-si (KR); Jun Hyoung Kim, Seongnam-si (KR); Sang Yoon Park, Daejeon (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 15/375,298

(22) Filed: Dec. 12, 2016

(65) Prior Publication Data

US 2018/0093432 A1    Apr. 5, 2018

(30) Foreign Application Priority Data

Oct. 4, 2016    (KR) .................. 10-2016-0127496

(51) Int. Cl.
*B29C 70/38*    (2006.01)
*B29C 70/50*    (2006.01)
*B29C 70/52*    (2006.01)

(52) U.S. Cl.
CPC ............ *B29C 70/382* (2013.01); *B29C 70/38* (2013.01); *B29C 70/504* (2013.01); *B29C 70/528* (2013.01)

(58) Field of Classification Search
CPC ... B29C 70/382; B29C 70/384; B29C 70/386; B29C 70/388
See application file for complete search history.

(56) References Cited

U.S. PATENT DOCUMENTS

| 4,907,754 A * | 3/1990 | Vaniglia | B29C 53/66 |
| | | | 156/425 |
| 2008/0006017 A1* | 1/2008 | Rindels | B29C 70/384 |
| | | | 57/112 |
| 2011/0117231 A1* | 5/2011 | Klockow | B29B 13/04 |
| | | | 425/102 |

FOREIGN PATENT DOCUMENTS

| JP | 2015-063049 A | 4/2015 |
| KR | 10-1323181 B1 | 10/2013 |

* cited by examiner

*Primary Examiner* — Jeffry H Aftergut
(74) *Attorney, Agent, or Firm* — Morgan, Lewis & Bockius LLP (57) ABSTRACT

A apparatus for laminating an object with a fiber tow, may include a fiber supply device provided with a plurality of first creels on which first fiber tows are wound and a plurality of second creels on which second fiber tows are wound; an impregnation device provided at a lower side of the fiber supply device, and impregnating the first fiber tows supplied from the first creels and the second fiber tows supplied from the second creels with a resin; and a lamination device provided at a lower side of the impregnation device, and laminating an object with the first and second fiber tows that are impregnated with the resin in accordance with a rolling motion of a laminating roller relative to the surface of the object.

9 Claims, 5 Drawing Sheets

APPARATUS FOR LAMINATING OBJECT WITH FIBER TOW

CROSS REFERENCE TO RELATED APPLICATION

The present application claims priority to Korean Patent Application No. 10-2016-0127496, filed Oct. 4, 2016, the entire contents of which is incorporated herein for all purposes by this reference.

BACKGROUND OF THE INVENTION

Field of the Invention

The present invention relates generally to an apparatus for laminating an object with a fiber tow. More particularly, the present invention relates to an apparatus for laminating an object with a fiber tow, the apparatus being configured for simultaneously laminating a surface of an object with first and second fiber tows that may be configured to be different from each other.

Description of Related Art

In general, in the case of an automated fiber placement (AFP), which is a method whereby an object is laminated with a fiber tow, the AFP method is designed to laminate a surface of the object with one type of fiber tow t. Thus, when it is desired to laminate an object with different types of fiber tows, the object is first laminated with one type of fiber tow and then a creel on which the first fiber tow is wound is replaced with an additional creel on which a different type of the fiber tow is wound. Then, the object is laminated with the different type of the fiber tow.

The AFP method is problematic in that it is time consuming, thus leading to a reduction in productivity. Thus, a study of an apparatus for laminating an object with a fiber tow, wherein the apparatus is capable of simultaneously or selectively laminating objects with different types of fiber tows is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for laminating an object with a fiber tow, wherein the apparatus is configured for simultaneously laminating a surface of an object with first and second fiber tows that may be configured to be different from each other.

A to one aspect of the present invention, there is provided an apparatus for laminating an object with a fiber tow, the apparatus including: a fiber supply device provided with a plurality of first creels on which first fiber tows are wound and a plurality of second creels on which second fiber tows are wound; an impregnation device provided at a lower side of the fiber supply device, and impregnating the first fiber tows supplied from the first creels and the second fiber tows supplied from the second creels with a resin; and a lamination device provided at a lower side of the impregnation device, and laminating a surface of an object with the first fiber tows impregnated with the resin and the second fiber tows impregnated with the resin in accordance with a rolling motion of a laminating roller relative to the surface of the object.

The supply device may further include: a dividing plate provided with the first creels on a first surface thereof, and with the second creels on a second surface thereof, wherein the first creels are provided at a first end portion of the first surface of the dividing plate, and the second creels are provided at a second end portion of the second surface of the dividing plate.

The laminating roller may be mounted between the first creels and the second creels at the lower side of the fiber supply device, and may be divided into a first side and a second side, and the first fiber tows may be wound on a first side of the laminating roller, and the second fiber tows may be wound on a second side of the laminating roller in a same direction as a winding direction of the first fiber tows.

The impregnation device may include: a first impregnating machine containing the resin therein, and provided at an upper portion thereof with an inlet through which the first fiber tows unwound from the plurality of the first creels are introduced, and at a lower portion thereof with an outlet through which the first fiber tows impregnated with the resin are discharged in a state of being integrally combined together; and a second impregnating machine containing the resin therein, and provided at an upper portion thereof with an inlet through which the second fiber tows unwound from the plurality of the second creels are introduced, and at a lower portion thereof with an outlet through which the second fiber tows impregnated with the resin are discharged in a state of being integrally combined together.

A processing device may be further mounted between the impregnation device and the lamination device, and cooling down and calendering the first and second fiber tows that are impregnated with the resin.

The processing device may include: a first cooling part firstly cooling down the resin impregnated in the first and second fiber tows; a calendering part provided at a lower side of the first cooling part, and passing the first and second fiber tows between a plurality of calendering rolls, so that pores of the resin impregnated in the first and second fiber tows are eliminated; and a second cooling part provided at a lower side of the calendering part, and additionally cooling down the resin impregnated in the first and second fiber tows.

The lamination device may further include: a roller support frame connected to the laminating roller and supporting the rolling motion of the laminating roller in a direction perpendicular to laminating directions of the first and second fiber tows; and a fixing frame to which the roller support frame is fixed.

The lamination device may further include: a holding part provided at an upper side of the laminating roller, and individually holding the first and second fiber tows passing therebetween; and a cutting part mounted between the holding part and the laminating roller, and individually cutting the first and second fiber tows.

The laminating roller may be separated into a first laminating roller on which the first fiber tows are wound and a second laminating roller on which the second fiber tows are wound; the roller support frame may be configured with a first roller support arm that is connected to the first laminating roller and supports the rolling motion of the first laminating roller in the direction perpendicular to the laminating direction of the first fiber tows, and a second roller support arm that is connected to the second laminating roller and supports the rolling motion of the second laminating roller in the direction perpendicular to the laminating direction of the second fiber tows; and the fixing frame may be configured with a first fixing arm to which the first roller support arm is fixed, and a second fixing arm to which the second roller support arm is fixed.

The first fixing arm and the second fixing arm may independently move in upward and downward directions.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing. n.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) may be intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings. Throughout the drawings, the same reference numerals will refer to the same or like parts.

Figure 1:
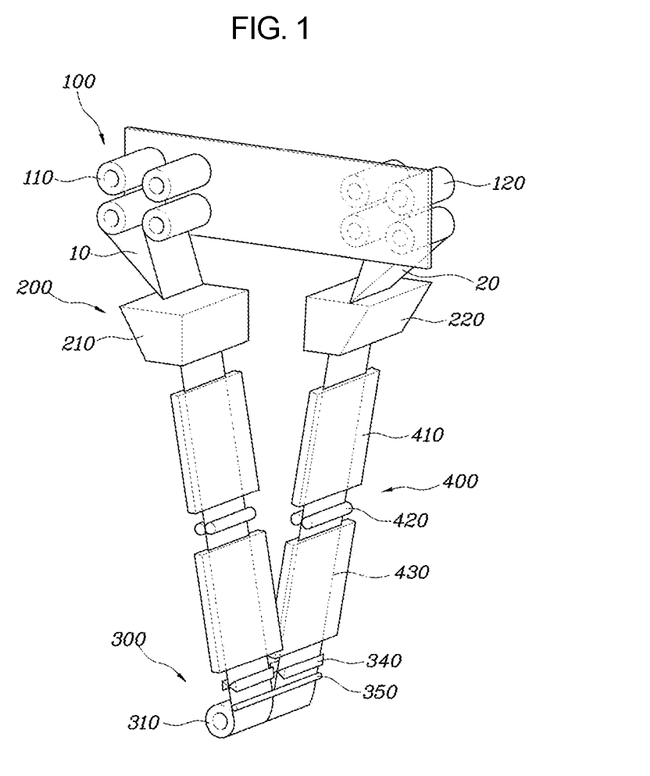
FIG. 1 is a view illustrating an apparatus for laminating an object with a fiber tow according to an exemplary embodiment of the present invention.
Figure 2:
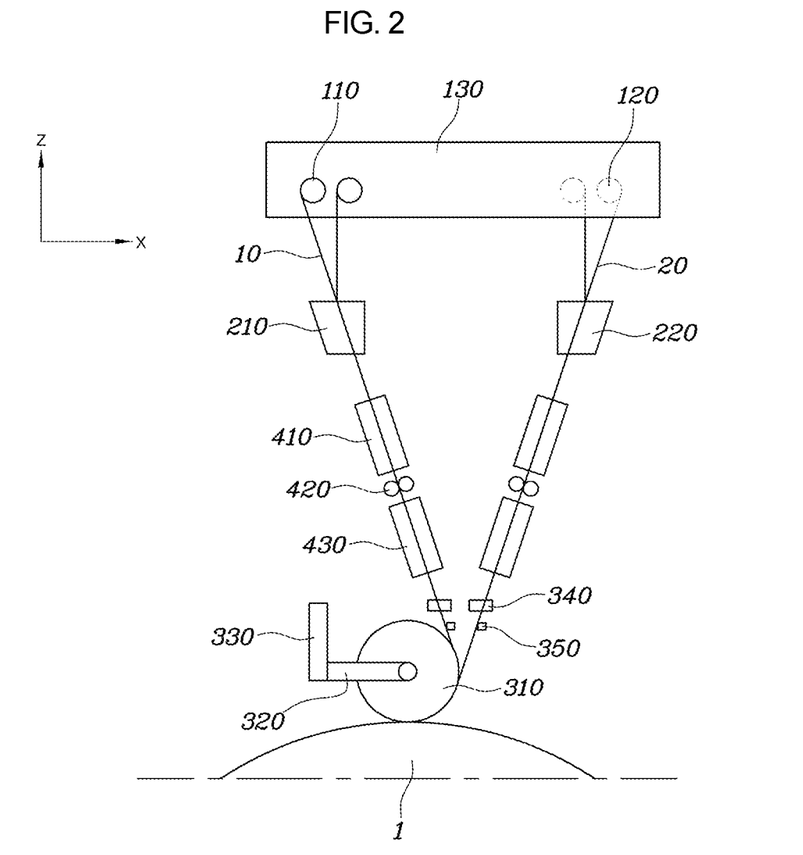
FIG. 2 is a schematic view illustrating a fiber supply device, an impregnation device, a processing device, and a lamination device according to an exemplary embodiment of the present invention.

With reference to FIGS. 1 to 2, an apparatus for laminating an object with a fiber tow according to an exemplary embodiment of the present invention includes: a fiber supply device 100 provided with a plurality of first creels 110 on which first fiber tows 10 are wound and a plurality of second creels 120 on which second fiber tows 20 are wound; a impregnation device 200 provided at a lower side of the fiber supply device 100, and impregnating the first fiber tows 10 supplied from the first creels 110 and the second fiber tows 20 supplied from the second creels 120 with a resin; and a lamination device 300 provided at a lower side of the impregnation device 200, and laminating the first fiber tows 10 impregnated with the resin and the second fiber tows 20 impregnated with the resin on a surface of an object 1 in accordance with a rolling motion of a laminating roller 310 relative to the surface of the object 1.

The term "fiber tow" is used herein to refer to filaments of fiber, fibers, a tow including a plurality of fibers, and a fiber tape. The fiber including the fiber tow includes a high-strength fiber including a carbon fiber, etc. and a high tenacity fiber including a glass fiber, an aramid fiber, etc., but is not limited thereto.

Further, the term "object 1" is used herein to refer to a product to be laminated with the fiber. It may be a component or a mold, but is not limited thereto.

The fiber supply device 100 is provided with the plurality of first creels 110 on which the first fiber tows 10 are wound and the plurality of second creels 120 on which the second fiber tows 20 are wound. As additional creels are provided in such a manner, it becomes possible to supply not only one type of fiber tow but also different types of the first and second fiber tows 10 and 20 with each other through the first and second creels 110 and 120.

For example, the first fiber tows 10 may include a carbon fiber having a high modulus of elasticity and the second fiber tows 20 may include a glass fiber having a relatively low modulus of elasticity. Further, the first and second fiber tows are respectively wound on the first and second creels 110 and 120. Thus, the first fiber tows 10 including the carbon fiber and the second fiber tows 20 including the glass fiber are simultaneously supplied through the fiber supply device 100.

The impregnation device 200 is provided at a lower side of the fiber supply device 100. The impregnation device 200 is supplied with the first and second fiber tows 10 and 20 from the fiber supply device 100, and is configured to allow the first and second fiber tows 10 and 20 to be impregnated with a resin and to be discharged in a downward direction.

The resin may include a thermoplastic resin including polyethylene (PE), polypropylene (PP), etc. or a thermosetting resin including polyurethane (PU), etc. without being limited thereto.

The lamination device 300 is provided at a lower side of the impregnation device 200. The lamination device 300 is supplied with the first and second fiber tows 10 and 20 that are impregnated with the resin from the impregnation device 200, and laminates a surface of an object 1 with the first and second fiber tows 10 and 20 by using a laminating roller 310. Here, while the laminating roller 310 moves relative to the surface of the object 1, the first and second fiber tows 10 and 20 that are impregnated with the resin are laminated on the surface of the object 1.

As described above, when the first fiber tows 10 and the second fiber tows 20 different in type from the first fiber tows 10 are supplied from the fiber supply device 100, it becomes possible to simultaneously laminate the surface of the object 1 with the first and second fiber tows 10 and 20 in accordance with a rolling motion the laminating roller 310.

In the exemplary embodiment, an apparatus body into which the fiber supply device 100, impregnation device 200, and lamination device 300 are accommodated may be configured, wherein the laminating roller 310 of the lamination device 300 moves in accordance with a movement of the apparatus body. Accordingly, the surface of the object 1 is laminated with the first and second fiber tows 10 and 20.

Figure 3:
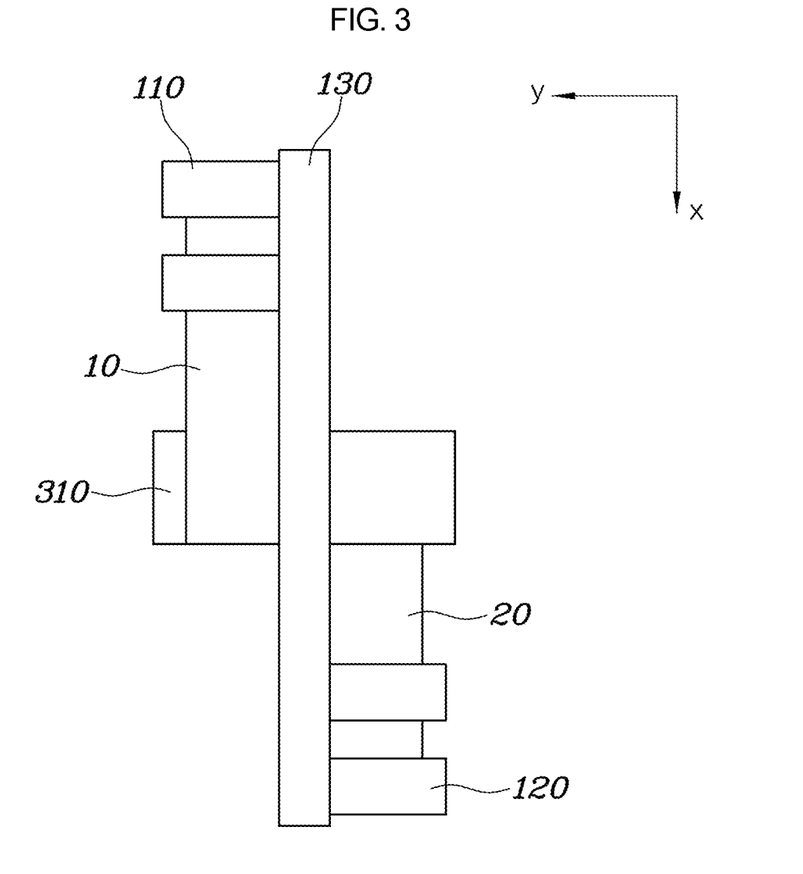
FIG. 3 is a view illustrating a dividing plate, first creels, second creels, and a laminating roller according to an exemplary embodiment of the present invention when viewed from above.

In the exemplary embodiment, the fiber supply device 100 may further include a dividing plate 130 provided with the first creels 110 at a first surface thereof, and with the second creels 120 at a second surface thereof. Here, the first creels 110 may be mounted at a first end portion of the dividing plate 130, and the second creels 120 may be mounted at a second end portion of the dividing plate 130.

The dividing plate 130 is configured in a form of a plate, and the plurality of first and second creels 110 and 120 are connected to opposite sides thereof. Here, the plurality of first creels 110 may be rotatably connected to the first surface of the dividing plate 130, and the plurality of second creels 120 may be rotatably connected to the second surface of the dividing plate 130. The plurality of first creels 110 is mounted at the first end portion of the first surface of the dividing plate 130, and the plurality of second creels 120 is mounted at the second end portion of the second surface of the dividing plate 130.

Accordingly, with reference to FIG. 2, when laterally viewing the apparatus for laminating an object with the fiber tow according to an exemplary embodiment of the present invention, an internal angle formed between the first fiber tows 10 supplied from the first creels 110 and the second fiber tows 20 supplied from the second creels 120 is an acute angle, and the first and second fiber tows 10 and 20 may meet at the laminating roller 310. In the exemplary embodiment, the dividing plate 130 may be configured to be fixed to an upper part of the apparatus body.

More in the exemplary embodiment, the laminating roller 310 may be mounted between the first creels 110 and the second creels 120 at a position lower than the fiber supply device 100, and may be divided into a first side and a second side based on the dividing plate 130. The first fiber tows 10 may be wound on a first side of the laminating roller 310, and the second fiber tows 20 may be wound on a second side of the laminating roller 310 in a same direction as a winding direction of the first fiber tows 10.

With reference to FIG. 3, when the apparatus for laminating an object with the fiber tow according to an exemplary embodiment of the present invention is viewed from above, the laminating roller 310 may be configured to be mounted between the first creels 110 of a first side of the dividing plate 130 and the second creels 120 of a second side of the dividing plate 130. Here, the laminating roller 310 may be divided into the first side and the second side based on the dividing plate 130.

The first side of the laminating roller 310 is wound with the first fiber tows 10 supplied from the first creels 110 and the second side of the laminating roller 310 is wound with the second fiber tows 20 supplied from the second creels 120. Here, the second fiber tows 20 are wound on the second side of the laminating roller 310 in a same direction as the winding direction of the first fiber tows 10. Thus, the surface of the object 1 is together laminated with first and second fiber tows 10 and 20 in accordance with the rolling motion of the laminating roller 310.

In the exemplary embodiment, the impregnation device 200 may include: a first impregnating machine 210 containing the resin therein, and provided at an upper portion thereof with an inlet through which the first fiber tows 10 unwound from the plurality of the first creels 110 are introduced, and at a lower portion thereof with an outlet through which the first fiber tows 10 impregnated with the resin are discharged in a state of being integrally combined together; and a second impregnating machine 220 containing the resin therein, and provided at an upper portion thereof with an inlet through which the second fiber tows 20 unwound from the plurality of the second creels 120 are introduced, and at a lower portion thereof with an outlet through which the second fiber tows 20 impregnated with the resin are discharged in a state of being integrally combined together.

The first impregnation machine 210 contains the resin therein, and is provided with the inlet at the upper portion thereof so that the first fiber tows 10 unwound from the plurality of the first creels 110 are introduced into the first impregnation machine 210 through the inlet. Further, the first impregnation machine 210 is provided with the outlet at the lower portion thereof so that the first fiber tows 10 impregnated in the resin while passing inside the first impregnation machine 210 are discharged therefrom through the outlet. The first impregnation machine 210 may maintain a predetermined temperature such that the resin contained therein is prevented from being cured.

In the exemplary embodiment, the first impregnation machine 210 may be configured to be fixed to the apparatus body. The first impregnation machine 210 may be provided directly below the plurality of first creels 110. Further, when the apparatus for laminating an object with the fiber tow according to an exemplary embodiment of the present invention is viewed from above, the first impregnation machine 210 may be provided at a lower side of a first side portion of the dividing plate 130.

Likewise, the second impregnation machine 220 contains the resin therein, and is provided with the inlet at the upper portion thereof so that the second fiber tows 20 unwound from the plurality of the second creels 120 are introduced into the second impregnation machine 220 through the inlet. Further, the second impregnation machine 220 is provided with the outlet at the lower portion thereof so that the second fiber tows 20 impregnated in the resin while passing inside the second impregnation machine 220 are discharged therefrom through the outlet. The second impregnation machine 220 may maintain a predetermined temperature such that the resin contained therein is prevented from being cured.

In the exemplary embodiment, the second impregnation machine 220 may be also configured to be fixed to the apparatus body. The second impregnation machine 220 may be provided directly below the plurality of second creels 120. Further, when the apparatus for laminating an object with the fiber tow according to an exemplary embodiment of the present invention is viewed from above, the second impregnation machine 220 may be provided at a lower side of a second side portion of the dividing plate 130.

In the exemplary embodiment, the apparatus for laminating an object with the fiber tow according to an exemplary embodiment of the present invention may further include: a processing device 400 mounted between the impregnation device 200 and the lamination device 300, and cooling down and calendering the first and second fiber tows 10 and 20 that are impregnated with the resin.

The processing device 400 is provided at a lower side of the impregnation device 200 and at an upper side of the lamination device 300. The processing device 400 cools down the resin of the first and second fiber tows 10 and 20 that are passed through the impregnation device 200 such that the resin is partially cured, and performs calendering to eliminate pores contained in the resin.

Accordingly, the processing device 400 is configured to process the first and second fiber tows 10 and 20 that are partially cured and from which the pores are eliminated so that the first and second fiber tows 10 and 20 are supplied to the lamination device 300 and are laminated on the surface of the object 1. In the exemplary embodiment, the processing device 400 is accommodated in the apparatus body and moves in accordance with a movement of the apparatus body.

More in the exemplary embodiment, the processing device 400 may include: a first cooling part 410 firstly cooling down the resin impregnated in the first and second fiber tows 10 and 20; a calendering part 420 provided at a lower side of the first cooling part, and passing the first and second fiber tows 10 and 20 between a plurality of calendering rolls, so that pores of the resin impregnated in the first and second fiber tows 10 and 20 are eliminated; and a second cooling part 430 provided at a lower side of the calendering part 420, and additionally cooling down the resin impregnated in the first and second fiber tows 10 and 20.

The first cooling part 410 is provided at a lower side of the impregnation device 200, and is configured to cool down the resin of the first and second fiber tows 10 and 20 such that the resin is partially cured. In the exemplary embodiment, the calendering part 420 may be configured to be fixed to the apparatus body.

The calendering part 420 is provided at a lower side of the first cooling part 410, and is configured to eliminate the pores contained in the resin while allowing the first and second fiber tows 10 and 20 to pass between the calendering rolls. In the exemplary embodiment, the calendering part 420 may be configured to be fixed to the apparatus body.

The second cooling part 430 is provided at a lower side of the calendering part 420, and is configured to additionally cool down the resin of the first and second fiber tows 10 and 20 from which the pores are eliminated such that the resin is cured until it becomes appropriate for lamination on the surface of the object 1. In the exemplary embodiment, the second cooling part 430 may be also configured to be fixed to the apparatus body.

In the exemplary embodiment, the lamination device 300 may further include: a roller support frame 320 connected to the laminating roller 310 and supporting the rolling motion of the laminating roller 310 in a direction perpendicular to laminating directions of the first and second fiber tows 10 and 20; and a fixing frame 330 to which the roller support frame 320 is fixed.

The roller support frame 320 is connected to the laminating roller 310 and supports the rolling motion of the laminating roller 310 in the direction perpendicular to laminating directions of the first and second fiber tows 10 and 20 in accordance with a movement of the apparatus for an object laminating with the fiber tow according to an exemplary embodiment of the present invention.

In the exemplary embodiment, the fixing frame 330 to which the roller support frame 320 is fixed may be configured to be fixed to the apparatus body. Accordingly, the laminating roller 310 moves relative the surface of the object 1 in accordance with a movement of the apparatus body by being supported by the roller support frame 320 that is fixed to the fixing frame 330.

Figure 4:
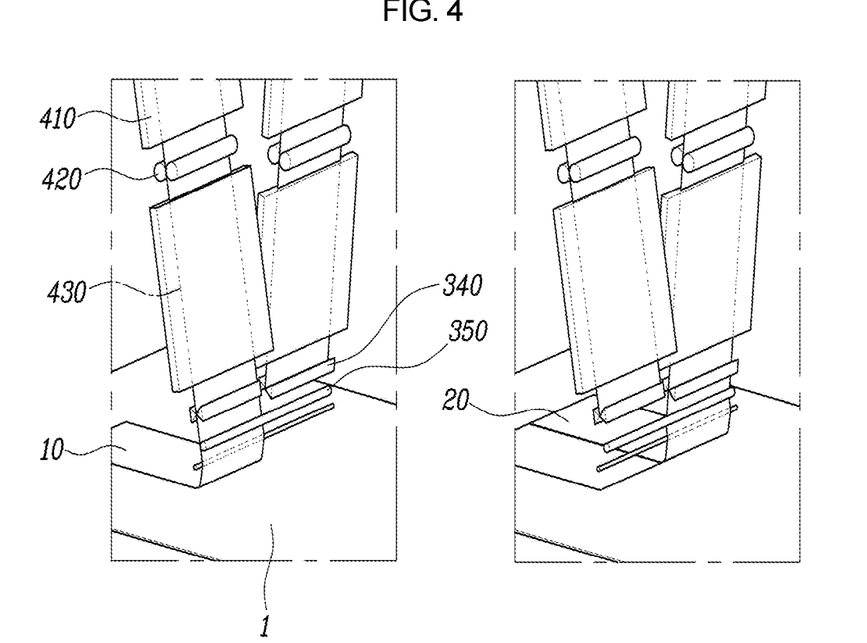
FIG. 4 is a view illustrating an operation of a holding part according to an exemplary embodiment of the present invention.

Further, the lamination device 300 may further include: a holding part 340 provided at an upper side of the laminating roller 310 and individually holding the first and second fiber tows 10 and 20 passing therebetween; and a cutting part 350 mounted between the holding part 340 and the laminating roller 310, and individually cutting the first and second fiber tows 10 and 20.

The holding part 340 is provided at an upper side of the laminating roller 310. In the exemplary embodiment, the holding part 340 is provided at a lower side of the laminating roller 310 to are configured to determine whether to supply the first and second fiber tows 10 and 20 to the laminating roller 310 or not.

With reference to FIG. 4, when the holding part 340 is configured to be operated to hold the first fiber tow 10 or the second fiber tow 20, the first fiber tow 10 or the second fiber tow 20 fails to be wound relative to the laminating roller 310. Accordingly, the first fiber tow 10 or the second fiber tow 20 is prevented from being laminated on the surface of the object 1. Thus, by selectively adjusting an operation of the holding part 340, the first fiber tows 10 and the second fiber tows 20 can be simultaneously laminated on the surface of the object 1, or only one of the first and second fiber tows 10 and 20 can be laminated on the surface of the object 1.

The cutting part 350 is provided at a lower side of the holding part 340 and at an upper side of the laminating roller 310, and is configured to cut the first fiber tows 10 or the second fiber tows 20 by provision of a cutting means. For example, when it is desired to for a predetermined time laminate the surface of the object 1 with only the first fiber tows 10, firstly the holding part 340 is operated to hold the second fiber tows 20, and then the cutting part 350 is operated to cut a lower portion of the second fiber tows 20 that is held by the holding part 340. Thus, although the laminating roller 310 moves relative to the surface of the object 1, only the first fiber tows 10 can be laminated on the surface of the object 1 without lamination of the second fiber tows 20.

Figure 5:
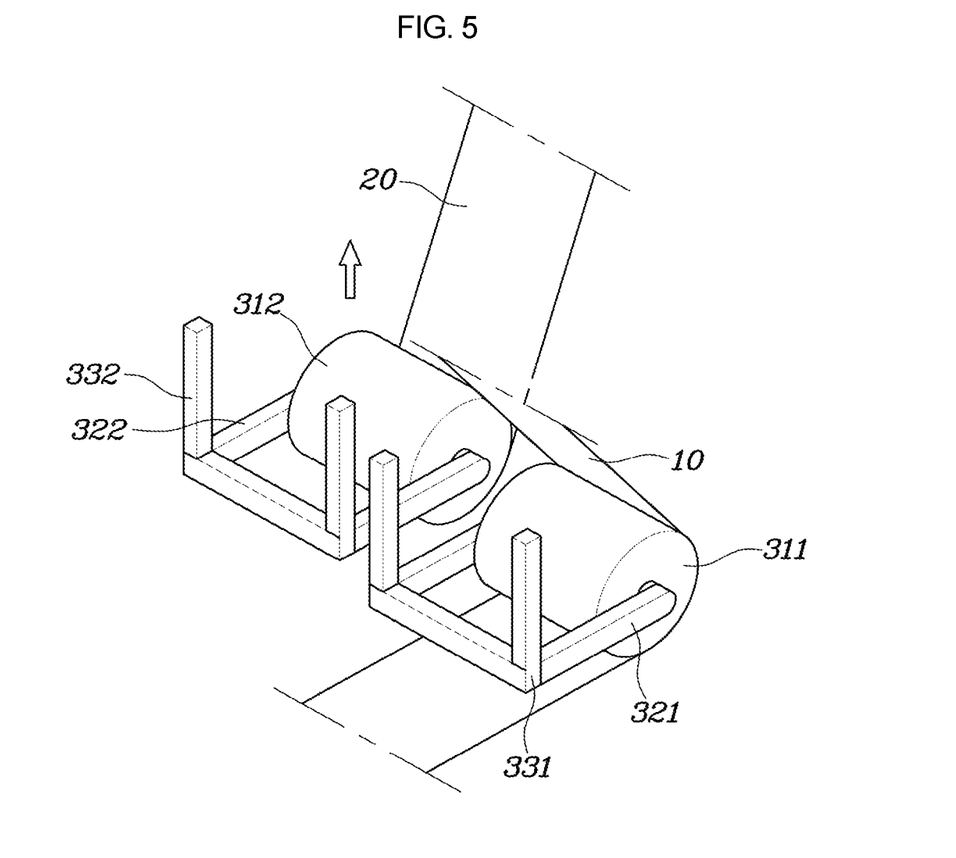
FIG. 5 is a view illustrating an operation of a second fixing arm according to an exemplary embodiment of the present invention.

With reference to FIG. 5, in the exemplary embodiment, the laminating roller 310 is separated into a first laminating roller 311 on which the first fiber tows 10 are wound and a second laminating roller 312 on which the second fiber tows 20 are wound; the roller support frame 320 is configured with a first roller support arm 321 that is connected to the first laminating roller 311 and supports the rolling motion of the first laminating roller 311 in the direction perpendicular to the laminating direction of the first fiber tows 10, and a second roller support arm 322 that is connected to the second laminating roller 312 and supports the rolling motion of the second laminating roller 312 in the direction perpendicular to the laminating direction of the second fiber tows 20; and the fixing frame 330 is configured with a first fixing arm 331 to which the first roller support arm 321 is fixed, and a second fixing arm 332 to which the second roller support arm 322 is fixed.

More in the exemplary embodiment, the first fixing arm 331 and the second fixing arm 332 may independently move in upward and downward directions.

The laminating roller 310 may be separated at a center thereof and may be divided into the first laminating roller 311 and the second laminating roller 312. The first laminating roller 311 on which the first fiber tows 10 are wound, and the rolling motion thereof is supported by the first roller support arm 321, and the first roller support arm 321 is fixed to the first fixing arm 331. The second laminating roller 312 on which the second fiber tows 20 are wound, and the rolling motion thereof is supported by the second roller support arm 322, and the second roller support arm 322 is fixed to the second fixing arm 332.

Accordingly, the lamination device 300 is separated based on the first fiber tows 10 and the second fiber tows 20, and the first fixing arm 331 and the second fixing arm 332 are connected to the apparatus body to be movable in upward and downward directions. Thus, it becomes possible to selectively laminate the surface of the object 1 with only the first fiber tows 10 or the second fiber tows 20.

For example, when it is desired to laminate the surface of the object 1 with the first fiber tows 10, the second fixing arm 332 is controlled to move upwards such that only the first laminating roller 311 moves relative to the surface of the object 1. Thus, it becomes possible to laminate the surface of the object 1 with only the first fiber tows 10 in accordance with the rolling motion of the first laminating roller 311.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for laminating an object with a fiber tow, the apparatus comprising:
    a fiber supply device provided with a plurality of first creels on which first fiber tows are wound and a plurality of second creels on which second fiber tows are wound;
    an impregnation device provided at a lower side of the fiber supply device, and impregnating the first fiber tows supplied from the first creels and the second fiber tows supplied from the second creels with a resin;
    a lamination device provided at a lower side of the impregnation device, and laminating a surface of the object with the first fiber tows impregnated with the resin and the second fiber tows impregnated with the resin in accordance with a rolling motion of a laminating roller relative to the surface of the object; and
    a processing device mounted between the impregnation device and the lamination device, and cooling down and calendering the first and second fiber tows that are impregnated with the resin.

2. The apparatus of claim 1, wherein the supply device further includes:
    a dividing plate provided with the first creels on a first surface thereof, and with the second creels on a second surface thereof,
    wherein the first creels are provided at a first end portion of the first surface of the dividing plate, and the second creels are provided at a second end portion of the second surface of the dividing plate.

3. The apparatus of claim 2, wherein
    the laminating roller is mounted between the first creels and the second creels at the lower side of the fiber supply device, and is divided into a first side and a second side, and
    the first fiber tows are wound on the first side of the laminating roller, and the second fiber tows are wound on the second side of the laminating roller in a same direction as a winding direction of the first fiber tows.

4. The apparatus of claim 1, wherein the impregnation device includes:
    a first impregnating machine containing the resin therein, and provided at an upper portion thereof with an inlet through which the first fiber tows unwound from the plurality of the first creels are introduced, and at a lower portion thereof with an outlet through which the first fiber tows impregnated with the resin are discharged in a state of being integrally combined together; and
    a second impregnating machine containing the resin therein, and provided at an upper portion thereof with an inlet through which the second fiber tows unwound from the plurality of the second creels are introduced, and at a lower portion thereof with an outlet through which the second fiber tows impregnated with the resin are discharged in a state of being integrally combined together.

5. The apparatus of claim 1, wherein the processing device includes:
    a first cooling part firstly cooling down the resin impregnated in the first and second fiber tows;
    a calendering part provided at a lower side of the first cooling part, and passing the first and second fiber tows between a plurality of calendering rolls, so that pores of the resin impregnated in the first and second fiber tows are eliminated, and
    a second cooling part provided at a lower side of the calendering part, and additionally cooling down the resin impregnated in the first and second fiber tows.

6. The apparatus of claim 1, wherein the lamination device further includes:
    a roller support frame connected to the laminating roller and supporting the rolling motion of the laminating roller in a direction perpendicular to laminating directions of the first and second fiber tows; and
    a fixing frame to which the roller support frame is fixed.

7. The apparatus of claim 6, wherein the lamination device further includes:
    a holding part provided at an upper side of the laminating roller, and individually holding the first and second fiber tows passing therebetween; and
    a cutting part mounted between the holding part and the laminating roller, and individually cutting the first and second fiber tows.

8. The apparatus of claim 6, wherein
    the laminating roller is separated into a first laminating roller on which the first fiber tows are wound and a second laminating roller on which the second fiber tows are wound,
    the roller support frame is configured with a first roller support arm that is connected to the first laminating roller and supports the rolling motion of the first laminating roller in the direction perpendicular to the laminating direction of the first fiber tows, and a second roller support arm that is connected to the second laminating roller and supports the rolling motion of the second laminating roller in the direction perpendicular to the laminating direction of the second fiber tows, and the fixing frame is configured with a first fixing arm to which the first roller support arm is fixed, and a second fixing arm to which the second roller support arm is fixed.

9. The apparatus of claim 8, wherein the first fixing arm and the second fixing arm independently move in upward and downward directions.

\* \* \* \* \*